United States Patent [19]

Matarelli

[11] E Re. 29,604

[45] Reissued Apr. 4, 1978

[54] WHIP FINISHING TOOL

[76] Inventor: Frank W. Matarelli, 4426 Irving St., San Francisco, Calif. 94122

[21] Appl. No.: 705,751

[22] Filed: Jul. 16, 1976

Related U.S. Patent Documents

Reissue of:

[64] Patent No.: 3,866,959
Issued: Feb. 18, 1975
Appl. No.: 468,030
Filed: May 8, 1974

[51] Int. Cl.[2] ..... D03J 3/00
[52] U.S. Cl. ..... 289/17
[58] Field of Search ..... 289/1.5, 1.7; 140/122, 140/123; 43/4

[56] References Cited

U.S. PATENT DOCUMENTS

| | | | |
|---|---|---|---|
| 2,859,994 | 11/1958 | Whitlinger | 289/17 |
| 2,899,226 | 8/1959 | Lint | 289/17 |
| 3,229,729 | 1/1966 | Robey et al. | 140/123 |
| 3,877,736 | 4/1975 | Zauskey | 289/1.7 |

*Primary Examiner*—Louis K. Rimrodt
*Attorney, Agent, or Firm*—Warren, Chickering & Grunewald

[57] ABSTRACT

A fly tyer's whip finishing tool comprising a one piece rigid slender element having a first substantially straight end portion with a hook formed at its free end; a substantially straight first intermediate portion having one end connected to and extending laterally from the opposite end of the first end portion; a U-shaped second intermediate portion having a pair of substantially parallel legs connected to the first intermediate portion; and a substantially straight second end portion which extends in a direction away from the first intermediate portion. The U-shaped portion defines a thread receiving socket in a plane substantially parallel to the free end hook and opening in the same direction. The second named end portion defines a handle and rotating axis for the device.

12 Claims, 9 Drawing Figures

WHIP FINISHING TOOL

Matter enclosed in heavy brackets [ ] appears in the original patent but forms no part of this reissue specification; matter printed in italics indicates the additions made by reissue.

BACKGROUND OF INVENTION

The invention relates to tools used as an aid to anglers in tying flies and, more specifically, in securing the tying thread to the hook shank and forming what is known as a whip finishing knot, see for example, U.S. Pat. No. 2,899,226.

Various tools have been proposed and some are being successfully used by anglers for tying flies. Generally the use of these tools are fairly difficult to master and require considerable skill and training to produce quality fly heads. Some are peculiarly designed for either right hand or left hand users and for small and large hooks.

SUMMARY OF INVENTION

The present whip finishing tool is composed of a one piece instrument without moving parts in the thread engaging portions of the tool. Importantly, the use of the tool requires a minimum exercise of skill and may be quickly mastered by anglers in the tying of flies of highest quality.

Another object and feature of the present invention is to provide a fly tying tool of the character described which may be easily and precisely manipulated by the angler to properly secure the hackle to the hook shank and to form the desired whip finishing knot.

Another object of the present invention is to provide a whip finishing tool which is equally applicable to either right or left hand users and which in a single size, may be used for tying of various size hooks.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

DETAILED DESCRIPTION OF INVENTION

Figure 1:
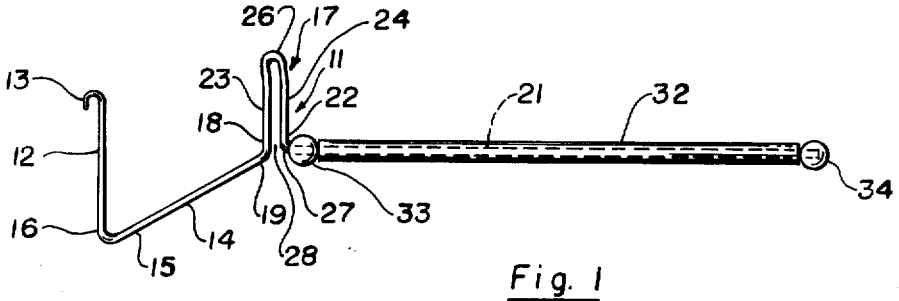
FIG. 1 is a side elevation of a whip finishing tool constructed in accordance with the present invention.

The whip finishing tool of the present invention comprises briefly a rigid slender element 11, such as steel wire, having a substantially straight free end portion 12 with a hook 13 formed at its free end; a substantially straight intermediate portion 14 having one end 15 connected to and extending laterally from the opposite end 16 of portion 12; a U-shaped intermediate portion 17 having one end 18 connected to the opposite end 19 of portion 14, and extending laterally therefrom in the direction of end portion 12; and a manually engageable substantially straight end portion 21 connected to the opposite end 22 of intermediate portion 17, and extending therefrom in a direction away from intermediate portion 14.

Importantly, intermediate portion 14 extends away from end portion 12 in a direction opposite to and in substantially the same plane as hook 13, so that hook 13, end portion 12 and intermediate portion 14 lie in a substantially common plane. Also, to facilitate the use of the tool, end portion 12 and intermediate portion 14 form an included angle of less than 90°. As will be seen in the later description of the use of the tool, this angulation of portion 14 forms an inclined ramp over which the thread may slide into the channel formed by the U-shaped intermediate portion 17, see FIG. 3.

Figure 4:
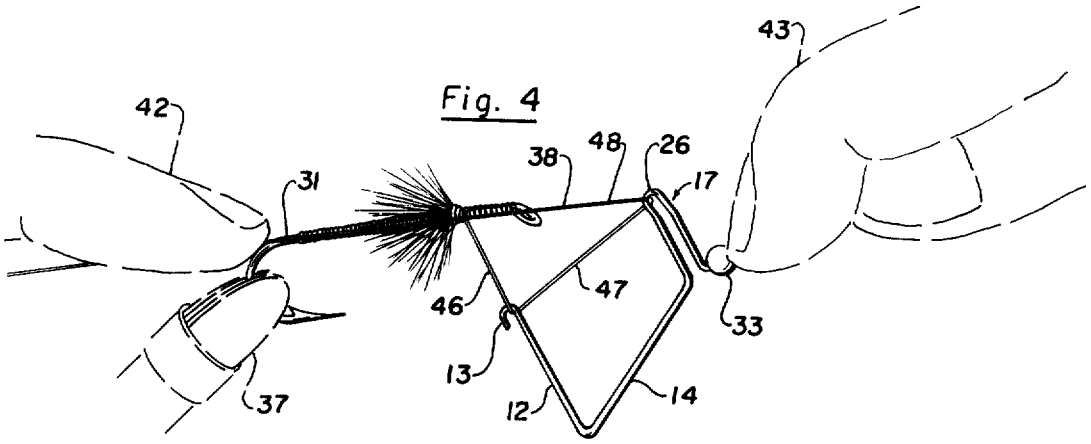
FIG. 4 is a side elevation of the tool and associated parts in a third position of use.
Figure 5:
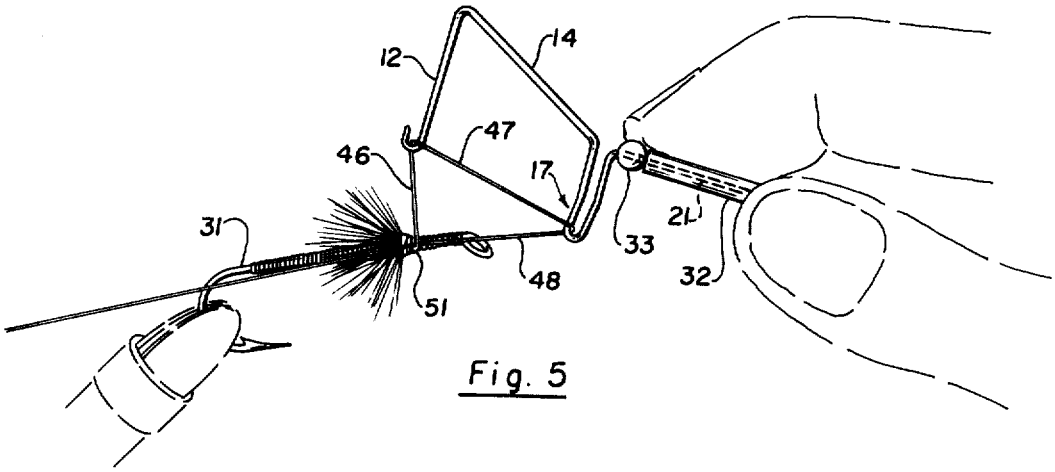
FIG. 5 is a side elevation of the tool and parts in a fourth position of use.
Figure 6:
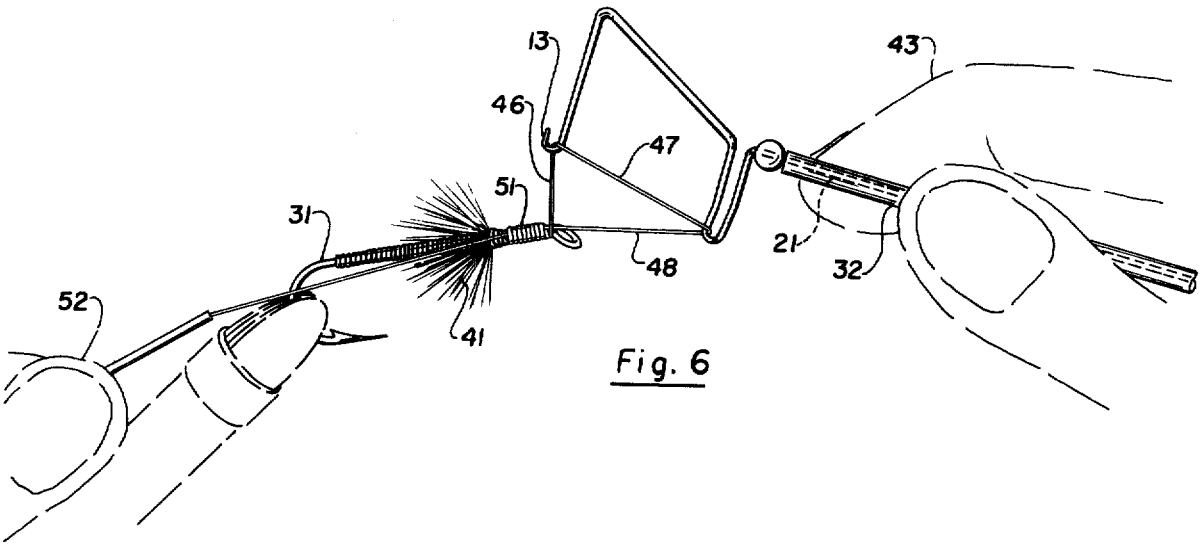
FIG. 6 is a side elevation of the tool and associated parts in a fifth position of use.

As will also be observed from the drawings, intermediate portion 17 is composed of a pair of legs 23 and 24 positioned in a substantially common plane with hook 13, end portion 12 and intermediate portion 14. These legs are joined at one end in a loop portion 26 and have their opposite ends 18 and 22 connected to ends 19 and 27 of portions 14 and 21, respectively. It will further be noted that legs 23 and 24 are substantially parallel to each other and to end portion 12 with the open end 28 of the thread receiving channel defined by the legs opening in the same direction as hook 13. Further, and as an aid to retaining the thread within the channel, see FIG. 4, et seq., loop portion 26 is preferably offset from legs 23 and 24 in the direction of end portion 12, thus trapping the thread within the offset loop when the thread is under tension as shown in FIGS. 4–6.

As a further feature of the present construction, end portion 21 extends away from the U-shaped intermediate portion 17 at substantially right angles, thereby forming a convenient axis of rotation of the tool around th hook shank 31 when in use. As a further aid to such manipulation of the tool, the handle forming end 21 is preferably disposed in a plane substantially coincident with end portion 12, and legs 23 and 24 of intermediate portion 17. Finally, to facilitate the proper rotation of the tool around the shank 31 of the hook being tied, a manually engageable sleeve 32 is here mounted in surrounding relation to end 21 for journalling the latter for rotation. Enlargements 33 and 34 are preferably provided on end 21 at the opposite ends of sleeve 32 for centering sleeve 32 on end 21 and providing finger engaging stops to restrain relative rotation.

OPERATION

The fish hook 36 to be tied is fastened in the usual manner in the jaws of a conventional hook supporting vise 37 with the hook shank 31 projecting generally horizontally therefrom as depicted in the FIGS. 1–9.

Figure 2:
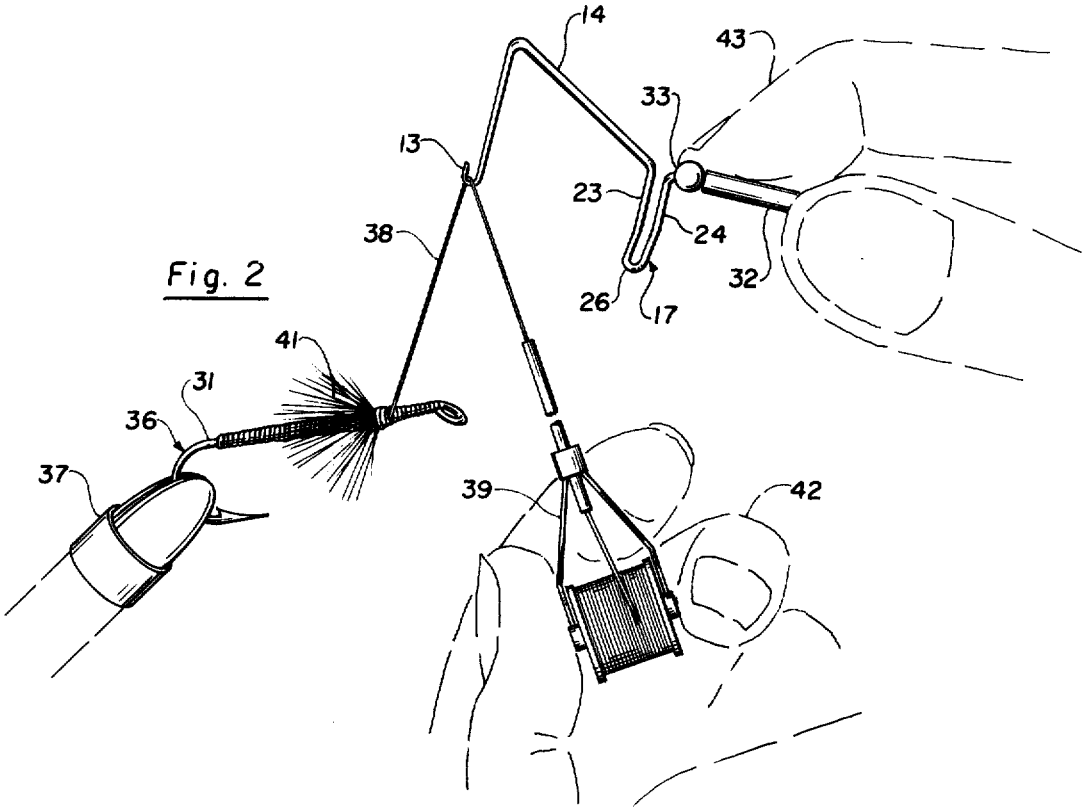
FIG. 2 is a side elevation of the tool shown in conjunction with a fly hook and thread and thread bobbin in a first position of use.
Figure 3:
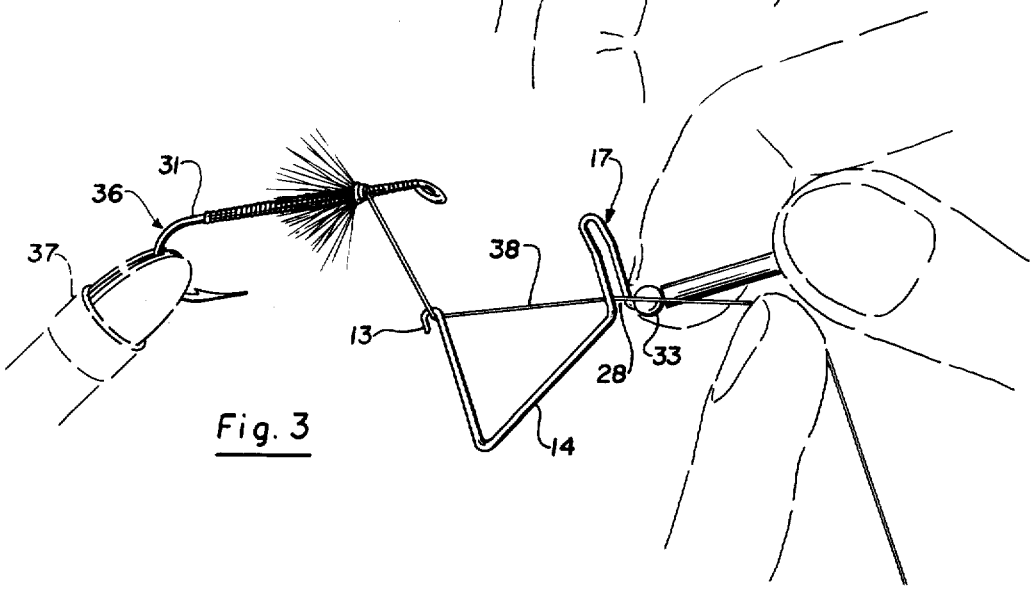
FIG. 3 is a side elevation of the parts of FIG. 2 in a second position of use.

Fly tying thread 38 carried by bobbin 39 is wound asround shank 31 to initialling position and secure hackle 41 in desired position on the hook. The tool of the present invention will then be used to complete the tying of the hackle and a forming of the conventional whip finishing knot. After the hackle or material has been initially secured, as shown in FIG. 2, bobbin 39 will be held in the left hand 42 of the user while the tool handle 32 is engaged by the right hand of the user, assuming the user to be right-handed. For left-handed persons, the hand position may be reversed. The first step is to engage hook 13 under thread 38 drawing the latter upwardly, as shown in FIG. 2, while a length of thread is payed out from bobbin 39. Due to the angularities and spacial relationship of the parts above explained, the tool will automatically orient, i.e., rotate, to the position shown in FIG. 2. The tool is then rotated 180° using finger pressure against enlargement 33 and/or against the U-shaped intermediate portion 17, and, at the same time, moving the tool downwardly with respect to the hook and moving the thread laterally to the right, as seen in FIG. 3, so as to slide over the inclined intermediate portion 14 and into the entry slot 28 of the U-shaped portion 17. The thread 38 is then elevated in the slot with the bobbin moved back to the left, as seen in FIG. 4, with the thread 38 generally paralleling the hook shank 31. As will be clear from the foregoing description of the parts, the tool will assume a stable rotated position as seen in FIG. 4. In this position, it is important to note the triangle formed by the thread and composed of an altitude dimension 46 extending generally perpendicular to hook shank 31 between the shank and the tool hook 13, a base dimension 47 extending between hook 13 and loop 26 and a hypotenuse dimension 48 extending from loop 26 and alongside of hook shank 31. The offsetting of loop 26 in the direction of hook 13 tends to keep the thread in the loop so long as the thread is taut. The size of the thread triangle is controlled and may, from time to time, be adjusted by the user, by the amount of thread payed out from the bobbin.

The next step, as shown in FIG. 5, is to effect a winding of the altitude side 46 around the tool shank and at the same time around the parallel drawn thread side 48. This may be readily accomplished by merely rotating the tool handle in a circle clockwise around the axis of the shank. With such rotation, the tool head will automatically rotate to position the plane of end 12, intermediate portion 14, and U-shaped portion 17, radially of the axis of rotation; and during such rotation, the user can control the thread leaving the bobbin so as to in turn control the size of the thread triangle. With the triangle, the user can swing the altitude thread 46 over the hackle, around the wing and otherwise manipulate the thread to best tie down the fly and at the same time form the multiplicity of loops 51 around the hook shank and thread side 48 as required for forming the whip finishing knot.

Figure 7:
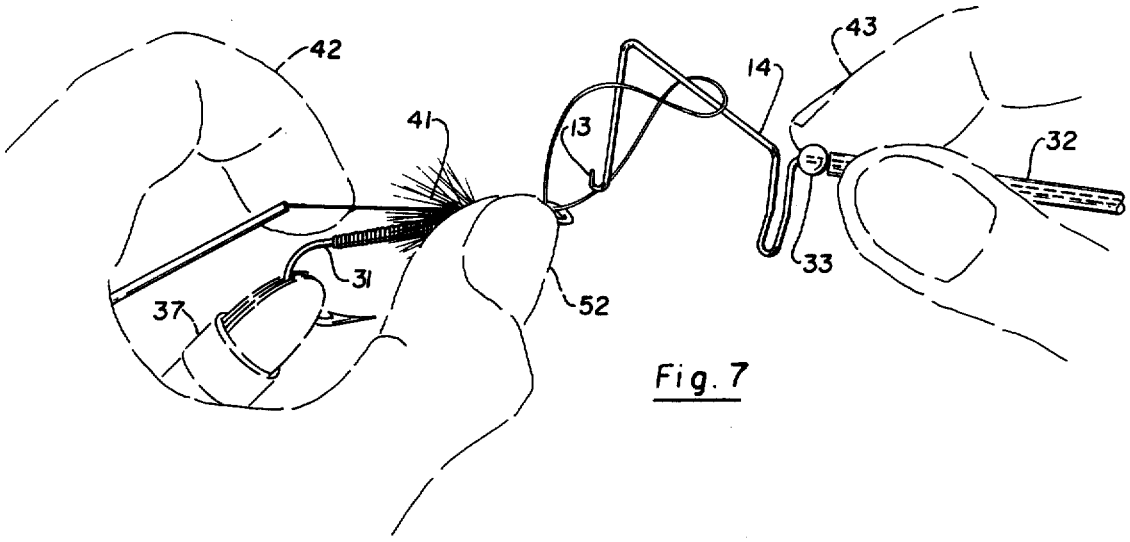
FIG. 7 is a side elevation of the tool and associated parts in a first step forming the whip finishing knot.
Figure 8:
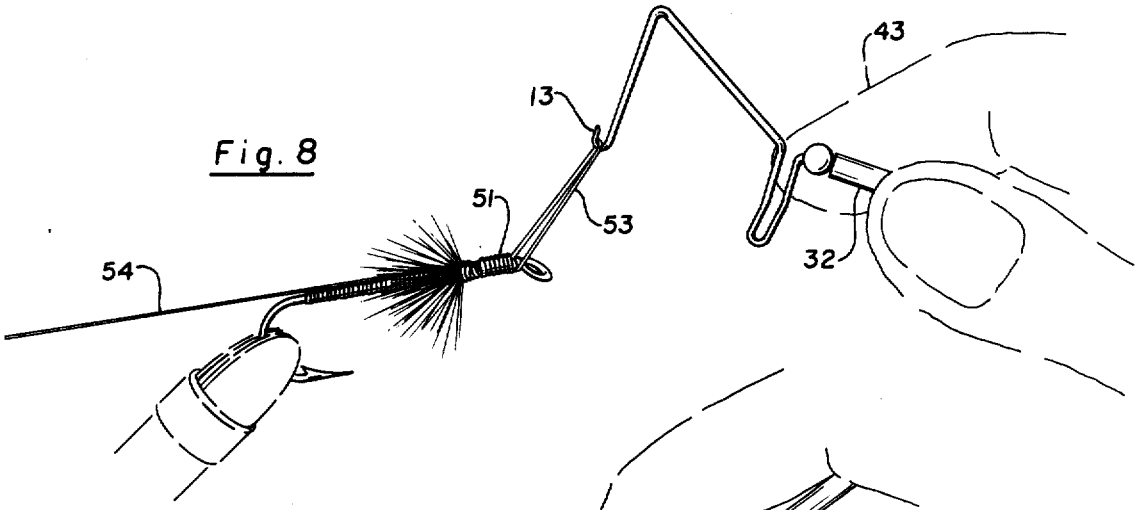
FIG. 8 is a side elevation of the tool and associated parts in a second position forming the whip finishing knot.
Figure 9:
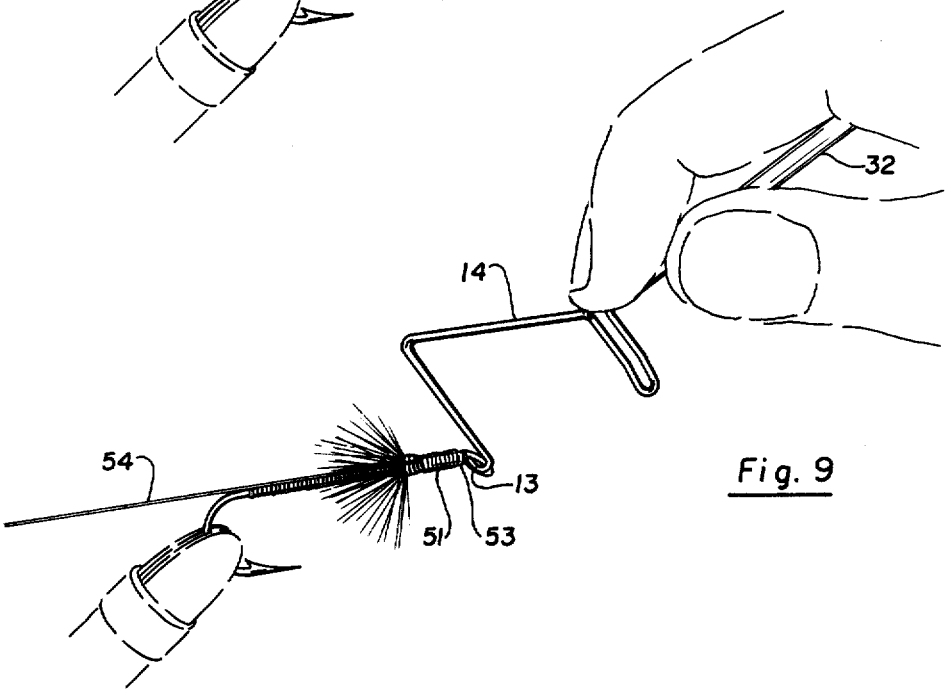
FIG. 9 is a side elevation of the tool and associated parts in a final position of forming the whip finishing knot.

When the desired number of loops 51 have been formed as illustrated in FIG. 6, the user will place his left thumb 52 or other finger against loops 51 to retain the thread in position while disengaging the tool. Such disengagement may be easily effected by relative displacement of the tool and thread as illustrated in FIGS. 6 and 7. When the tool has been so disengaged, tool hook 13 is engaged with the thread loop formed by the excess thread on removal of the tool, finger 52 is withdrawn from the loops 51, and the right and left hands of the user are moved apart so as to place the thread, including loop 53, under tension. The thread controlled by the user's left hand and depicted at 54 in FIGS. 8 and 9, is drawn to the left, as seen in the drawings, thus reducing the size of loop 53. During such loop reduction, some force is maintained by the user's right hand, which keeps loop 53 taut as it is drawn down to the hook shank. As the loop is reduced to nothing, hook 13 is slipped out of the loop and thread 54 drawn to complete a clean finish at the right-hand end of loops 51, as viewed in FIG. 9. Thread 54 may then be severed at the left-hand end of loops 51 so as to complete the whip finishing knot.

*In the foregoing operation it will be noted that loop 26 forms a second rigidly mounted hook cofunctioning with hook 13 for receiving and slidably retaining the bobbin thread in two points of the above-described thread triangle comprising thread sides 46, 47 and 48. In this arrangement thread side 48 is distended by hook 26 generally alongside of and projecting longitudinally from the hook shank 31 and thread triangle side 46 is distended by hook 13 laterally of shank 31 and thread side 48. The third thread triangle side 47 extends between the hooks whereby, upon rotation of the tool around the shank, as depicted in FIGS. 4–6, the thread will form loops around thread side 48 and around the shank, while thread is manually released from bobbin 39 for sliding through the thread loops thus formed and to the thread triangle. Since hooks 13 and 26 are supported in a fixed spacing, the operator, by the controlled manual release of thread from the bobbin, will determine the size of the thread triangle as required for skillful manipulation of the thread in and about the hackle to tie down the fly and form the whip finishing knot. In this arrangement, forwardly mounted hook 13 restrains thread movement to the rear, and rearwardly mounted hook 26 restrains movement to the fore, the hooks being formed, as hereinabove noted, in a substantially common plane longitudinally of handle 21 and supported to retain a fixed constant spacing in use.*

What is claimed is:

1. A whip finishing tool comprising:

a rigid slender element having a first substantially straight free end portion with a hook formed at its free end;

a substantially straight first intermediate portion having one end connected to and extending laterally from the opposite end of said first end portion;

a second U-shaped intermediate portion having one end connected to the opposite end of said first intermediate portion and extending laterally therefrom in the direction of said first end portion; and a manually engageable substantially straight second end portion connected to the opposite end of said second intermediate portion and extending therefrom in a direction away from said first intermediate portion.

2. A tool as defined in claim 1, said first intermediate portion extending away from said first end portion in a direction opposite to and in substantially the same plane as said hook.

3. A tool as defined in claim 2, said second intermediate portion comprising a pair of legs positioned in a substantially common plane with said hook and said first end portion and said first intermediate portion.

4. A tool as defined in claim 3, said legs being joined at one end in a loop portion and having their opposite ends connected to said first intermediate portion and said second end portion.

5. A tool as defined in claim 4, said legs being substantially parallel to each other and to said first end portion.

6. A tool as defined in claim 5, said loop portion being offset from said legs in the direction of said first end portion.

7. A tool as defined in claim 1, said first end portion and said first intermediate portion forming an included angle of less than 90°.

8. A tool as defined in claim 1, said second end portion extending substantially perpendicular to said second intermediate portion.

9. A tool as defined in claim 8, said second end portion extending in a plane substantially coincident with said first end portion and said first and second intermediate portion.

10. A tool as defined in claim 9, and a manually engageable sleeve surrounding and journalling for rotation said second end portion.

*11. A tool for engaging and manipulating the thread from a thread source while manually held in one hand of the user for forming a whip finishing knot on an elongated shank of a fly fishing hook comprising:*

*an elongated handle adapted for engagement with the other hand of the user;*

*means connected to and extending longitudinally from said handle and forming a pair of relatively forwardly and rearwardly disposed and rigidly mounted hooks formed for receiving and sliding retension of said thread in two points of a thread triangle having a first side extending from said thread source and distended by one of said hooks generally alongside of and projecting longitudinally from said hook shank, and a second side distended by the other of said hooks laterally of said shank and first side, and a third side connecting said hooks, whereby upon rotation of said tool around said shank said thread will form loops around said first side and said shank while thread is manually released from said source for sliding through said loops to said triangle, said hooks being offset in the same direction from the longitudinal axis of said handle and said forwardly mounted hook restraining thread movement to the rear and said rearwardly mounted hook restraining thread movement to the fore, said hooks being formed in a substantially common plane longitudinally of said handle and supported to retain a constant spacing and cofunctioning with controlled manual release of said thread during rotation to control the size of said triangle.*

*12. A tool as defined in claim 11, said hooks having hook sides defining thread-receiving passages opening toward said axis and said sides being disposed in a common plane with said axis.*

* * * * *